(12) United States Patent
Foster

(10) Patent No.: US 8,667,316 B2
(45) Date of Patent: Mar. 4, 2014

(54) PRECISION SYNCHRONISATION ARCHITECTURE FOR SUPERSPEED UNIVERSAL SERIAL BUS DEVICES

(75) Inventor: Peter Graham Foster, Parkside (AU)

(73) Assignee: Chronologic Pty. Ltd., Adelaide (AU)

( * ) Notice: Subject to any disclaimer, the term of this patent is extended or adjusted under 35 U.S.C. 154(b) by 275 days.

(21) Appl. No.: 13/320,401

(22) PCT Filed: May 20, 2010

(86) PCT No.: PCT/AU2010/000606
§ 371 (c)(1),
(2), (4) Date: Nov. 14, 2011

(87) PCT Pub. No.: WO2010/132945
PCT Pub. Date: Nov. 25, 2010

(65) Prior Publication Data
US 2012/0059965 A1 Mar. 8, 2012

Related U.S. Application Data

(60) Provisional application No. 61/179,904, filed on May 20, 2009.

(51) Int. Cl.
*G06F 1/12* (2006.01)
(52) U.S. Cl.
CPC ........................ *G06F 1/12* (2013.01)
USPC ........... 713/400; 713/500; 713/502; 713/503; 710/305
(58) Field of Classification Search
USPC ....................................................... 713/375
See application file for complete search history.

(56) References Cited

U.S. PATENT DOCUMENTS

| | | | |
|---|---|---|---|
| 5,566,180 | A | 10/1996 | Eidson et al. |
| 6,092,210 | A | 7/2000 | Larky et al. |
| 6,278,710 | B1 | 8/2001 | Eidson |
| 6,343,364 | B1 | 1/2002 | Leydier et al. |
| 6,665,316 | B1 | 12/2003 | Eidson |
| 6,741,952 | B2 | 5/2004 | Eidson |
| 6,950,610 | B2 | 9/2005 | Lee |
| 7,251,199 | B2 | 7/2007 | Eidson |
| 7,539,793 | B2 | 5/2009 | Foster et al. |

(Continued)

FOREIGN PATENT DOCUMENTS

| | | |
|---|---|---|
| WO | WO 2007/092997 A1 | 8/2007 |
| WO | WO 2008/138052 A1 | 11/2008 |
| WO | WO 2008/138053 A1 | 11/2008 |

OTHER PUBLICATIONS

"Universal Serial Bus Specification," Apr. 27, 2000; pp. 1-622; Revision 2.0.

(Continued)

*Primary Examiner* — Ryan Stiglic
(74) *Attorney, Agent, or Firm* — Oliff PLC

(57) ABSTRACT

A method of providing a synchronization channel to a SuperSpeed USB device is provided. The method including a SuperSpeed communication channel connection to the SuperSpeed USB device with a USB cable that has USB 2.0 D+ and D− data signalling lines disabled or disconnected at an upstream connection point; multiplexing synchronization information onto the D+/D− data signalling lines at the upstream connection point; and demultiplexing the synchronization information from the D+/D− signalling lines at a downstream connection point of the cable; whereby the synchronization channel is maintained across the D+/D− data signalling lines.

14 Claims, 8 Drawing Sheets

(56) References Cited

U.S. PATENT DOCUMENTS

| | | | |
|---|---|---|---|
| 7,885,250 B2* | 2/2011 | Whittaker | 370/350 |
| 8,073,985 B1* | 12/2011 | Ni et al. | 710/11 |
| 8,200,873 B2* | 6/2012 | Tsukimori et al. | 710/117 |
| 8,301,831 B2* | 10/2012 | Ni et al. | 711/103 |
| 8,499,186 B2* | 7/2013 | Tseng et al. | 713/500 |
| 2004/0033052 A1 | 2/2004 | Lim et al. | |
| 2004/0088445 A1 | 5/2004 | Weigold et al. | |
| 2008/0025287 A1* | 1/2008 | Whittaker | 370/350 |
| 2009/0222685 A1* | 9/2009 | Foster et al. | 713/500 |
| 2011/0138214 A1* | 6/2011 | Tseng et al. | 713/500 |
| 2012/0042120 A1* | 2/2012 | Ni et al. | 711/103 |
| 2012/0084594 A1* | 4/2012 | Chen et al. | 713/501 |

OTHER PUBLICATIONS

"Universal Serial Bus 3.0 Specification," Nov. 12, 2008; Revision 1.0.

International Search Report dated Aug. 3, 2010 in International Application No. PCT/AU2010/000605.

International Preliminary Report on Patentability dated Apr. 19, 2011 in International Application No. PCT/AU2010/000605.

International Search Report dated Aug. 5, 2010 in International Application No. PCT/AU2010/000606.

International Preliminary Report on Patentability dated Apr. 13, 2011 in International Application No. PCT/AU2010/000606.

U.S. Appl. No. 13/320,437, filed Nov. 14, 2011 in the name of Peter Graham Foster.

* cited by examiner

PRECISION SYNCHRONISATION ARCHITECTURE FOR SUPERSPEED UNIVERSAL SERIAL BUS DEVICES

RELATED APPLICATION

This application is based on and claims the benefit of the filing date of U.S. application No. 61/179,904 filed 20 May 2009, the content of which as filed is incorporated herein by reference in its entirety.

FIELD OF THE INVENTION

The present invention relates to a method and apparatus for providing a synchronization and timing system, with connectivity based on revision three of the Universal Serial Bus (USB) architecture (or USB 3.0), of particular but by no means exclusive use in providing clocks, data acquisition and automation and control of test and measurement equipment, instrumentation interfaces and process control equipment, synchronized to an essentially arbitrary degree in either a local environment or in a distributed scheme.

BACKGROUND OF THE INVENTION

The USB specification up to and including revision 2.0 was intended to facilitate the interoperation of devices from different vendors in an open architecture. USB 2.0 data is encoded using differential signalling (viz. in which two wires transfer the information) in the form of the difference between the signal levels of those two wires. The USB 2.0 specification is intended as an enhancement to the PC architecture, spanning portable, desktop and home environments.

However, USB was user focussed so the USB 2.0 specification lacked a mechanism for synchronising devices to any great precision. Several proposals attempted to address this and other deficiencies. For example, U.S. Pat. No. 6,343,364 (Leydier et al.) discloses an example of frequency locking to USB traffic, which is directed toward a smart card reader. This document teaches a local, free-running clock that is compared to USB SYNC and packet ID streams; its period is updated to match this frequency, resulting in a local clock with a nominal frequency of 1.5 MHz. This provides a degree of synchronization sufficient to read smart card information into a host PC but, as this approach is directed to a smart card reader, inter-device synchronization is not addressed.

WO 2007/092997 (Foster et al.) discloses a synchronized USB device that allows the generation of accurate clock frequencies on board the USB device regardless of the accuracy of the clock in the Host PC. The USB SOF packet is decoded by the USB device, and treated as a clock carrier signal instead of acting as a clock reference.

The carrier signal, once decoded from the USB traffic, is combined with a scaling factor to generate synchronization information and hence to synthesize a local clock signal with precise control of the clock frequency. In this way, the frequency of the local clock signal can be more accurate than the somewhat ambiguous frequency of the carrier signal.

This arrangement is said to be able to produce a local clock signal to arbitrarily high frequencies, such as a clock frequency of tens of megahertz, and thus to ensure that the local clock of each device connected to a given USB is synchronized in frequency. U.S. application Ser. No. 10/620,769 also teaches a method and apparatus to further synchronize multiple local clocks in phase by measurement of signal propagation time from the host to each device and provision of clock phase compensation on each of the USB devices.

U.S. patent application Ser. No. 12/279,328 (Foster et. al.) teaches synchronisation of the local clocks of a plurality of USB devices to a timebase received from another interface. In one embodiment, a USB device contains a local clock that is synchronised to an externally provided time signature across Ethernet using the IEEE-1588 protocol. In yet another embodiment the USB device's clock is synchronised to a timebase derived from a Global Positioning System (GPS) synchronised clock.

All of the above systems work within the bounds of conventional USB 2.0 and as such are limited in several areas. USB 2.0 is limited in range by the device response timeout. This is the window of time that the USB Host Controller allocates for receipt of a signal from a given USB device in response to a request from said USB Host Controller. The physical reach of USB 2.0 is therefore approximately 25 m.

The USB 3.0 specification was released in November 2008 and is also focussed on consumer applications. The USB 3.0 specification makes significant changes to the architecture of USB. In particular, the background art synchronisation schemes discussed above will not work with the new 5 Gb/s protocol (termed 'SuperSpeed USB') because it does away with the broadcast mechanism for SOF packets.

USB 3.0 defines two parallel and independent USB busses on the same connection cable. Firstly, the USB 2.0 bus remains unchanged (for backward compatibility) and offers Low Speed (1.5 Mb/s), Full Speed (12 Mb/s) and High Speed (480 Mb/s) protocols. The second bus—for 5 Gb/s traffic—provides the SuperSpeed USB. These busses operate independently, except that operation of the busses to a given USB device is mutually exclusive. That is, if a SuperSpeed connection is possible, then the USB 2.0 bus in disconnected to that device.

The dual-bus architecture of USB 3.0 is depicted schematically at 10 in FIG. 1. Personal Computer 12, containing USB Host Controller 14, is connected to USB 3.0 Hub 16 by first USB 3.0-compliant cable 18; USB 3.0 device 20 is connected to a downstream port 22 of USB 3.0 Hub 16 by second USB 3.0-compliant cable 24.

USB Host Controller 14 contains both a USB 2.0 Host 26 and a SuperSpeed Host 28. These two hosts 26, 28 are independent of one another, and each host 26, 28 is capable of connecting up to 127 devices (including hubs). USB 3.0-compliant cables are compound cables, containing a USB 2.0-compliant cable and a series of shielded conductors capable of transmitting SuperSpeed signals. Hence, USB 3.0-compliant cable 18 comprises USB 2.0-compliant cable 30 and shielded conductors 32.

USB 3.0 Hub 16 contains both a USB 2.0 Hub function 34 and a SuperSpeed Hub function 36, each connected directly to its respective Host 26, 28 by compound cable 18. USB 3.0 device 20 contains both a USB 2.0 device function 38 and a SuperSpeed device function 40, each connected back to its respective hub function 34, 36 of USB 3.0 Hub 16 by compound cable 24.

At enumeration of USB 3.0 device 20, SuperSpeed Host 28 checks for the presence of a SuperSpeed device function (40). If a SuperSpeed device is found, then a connection is established. If a SuperSpeed device is not found (as in the case where only a USB 2.0 device is connected to port 22), then the USB 2.0 Host 26 checks for the presence of a USB 2.0 device function (38) at device 20. Once the Host Controller 14 determines which device function is connected, it tells the USB 3.0 Hub 16 to only enable communication for downstream port 22 corresponding to whether the USB 2.0 device function 38 or SuperSpeed device function 40 is attached. This means that only one of the two parallel busses is in operation at any one time to an end device such as USB 3.0 device 20.

Furthermore, SuperSpeed USB has a different architecture from that of the USB 2.0 bus. Very high speed communication systems consume large amounts of power owing to high bit rates. A design requirement of SuperSpeed USB was lower power consumption, to extend the battery life of user devices. This has resulted in a change from the previous broadcast design of the USB 2.0: SuperSpeed is not a broadcast bus, but rather directs communication packets to a specific node in the system and shuts down communication on idle links.

This significantly affects any extension of the synchronisation schemes of, for example, U.S. patent application Ser. No. 12/279,328, whose method and apparatus for synchronising devices is based on a broadcast clock carrier signal that is delivered to each device on the bus, which is unsuitable in SuperSpeed USB.

A SuperSpeed Hub function acts as a device to the host (or upstream port) and as a host to the device (or downstream port). This means that the SuperSpeed Hub function acts to buffer and schedule transactions on its downstream ports rather than merely acting as a repeater. Similarly, the SuperSpeed Hub function does so with scheduling transmissions on the upstream port. A heavily burdened Hub function can therefore add significant non-deterministic delays in packet transmission through the system. This also precludes the use of USB 2.0 synchronisation schemes such as that of U.S. patent application Ser. No. 12/279,328 from operating on SuperSpeed USB.

The crude Isochronous synchronisation of USB 2.0 has been significantly improved in the USB 3.0 specification. Opening an Isochronous communication pipe between a Host Controller and a USB device guarantees a fixed bandwidth allocation in each Service Interval for the communication pipe. The Isochronous Protocol of USB 3.0 contains a so-called Isochronous Timestamp Packet (ITP), which is sent at somewhat regular intervals to each Isochronous Endpoint and which contains a timestamp of the beginning of ITP transmission by the USB Host Physical Layer (Phy) in the time domain of the Host Controller. The Isochronous Timestamp Packet is accurate to about 25 ns. SuperSpeed USB shuts down idle links to conserve power, but links must be active in order to receive an Isochronous Timestamp Packet. The Host Controller must therefore guarantee that all links to a device are in full active mode (termed power state U0) before transmission of the Isochronous Timestamp Packet.

Unfortunately the Isochronous Timestamp packet can be delayed in propagation down the USB network. USB 3.0 also does not provide a way of determining the propagation time of packets in SuperSpeed USB and hence no way of accurately knowing the phase relationship between time domains on different USB devices. Phase differences of several hundred nanoseconds are expected to be a best case scenario with SuperSpeed USB making it impractical for instrumentation or other precision timing requirements.

U.S. Pat. No. 5,566,180 (Eidson et al.) discloses a method of synchronising clocks in which a series of devices on a communication network transmit their local time to each other and network propagation time is determined by the ensemble of messages. Further disclosures by Eidson (U.S. Pat. Nos. 6,278,710, 6,665,316, 6,741,952 and 7,251,199) extend this concept but merely work toward a synchronisation scheme in which a constant stream of synchronising messages are transferred between each of the nodes of a distributed instrument network via Ethernet. This continual messaging consumes bandwidth and limits the accuracy of the possible synchronisation to several hundred nano-seconds in a point-to-point arrangement and substantially lower accuracy (typically micro-seconds) in a conventional switched subnet.

It should be understood that the terms 'clock signals' and 'synchronisation' in this disclosure are used to refer to clock signals, trigger signals, delay compensation information and propagation time measurement messages. It should also be understood that a 'notion of time' in this disclosure is used to denote an epoch or 'real time' and can also be used to refer to the combination of a clock signal and an associated epoch.

SUMMARY OF THE INVENTION

It is a general object of the present invention to enable precision synchronisation of a plurality USB devices, up to a predefined maximum, according to the USB3 Specification.

According a first broad aspect, the present invention provides a method of providing a synchronisation channel to a SuperSpeed USB device, comprising:

establishing a SuperSpeed communication channel connection to the SuperSpeed USB device with a USB cable that has USB 2.0 D+ and D− data signalling lines (i.e. of the cable) disabled or disconnected at an upstream connection point;

multiplexing synchronization information (i.e. additional to the standard synchronization information found in SuperSpeed Isochronous Timerstamp Packets) onto the D+/D− data signalling lines at the upstream connection point; and demultiplexing the synchronization information from the D+/D− signalling lines at a downstream connection point of the cable;

whereby the synchronisation channel is maintained across the D+/D− data signalling lines.

Thus, the present invention allows the synchronisation of the local clock of each of a plurality of SuperSpeed USB devices using only a single cable. This may desirably involve using the standard USB3 compliant device sockets to allow seamless use with other conventional USB cables and devices. The USB3.0 Specification defines that when a SuperSpeed connection has been made to a USB3.0 device, the hub disables the USB2.0 signals to that device. The present invention therefore makes it possible to design an instrumentation bus architecture that takes advantage of the unused signal wires in a USB3.0 cable when a SuperSpeed device connection has been made. This is equally applicable to any application requiring a synchronisation channel and USB SuperSpeed connectivity.

The (additional) synchronization information typically comprises clocking, absolute time reference and trigger signals, and in one embodiment a trigger signal, a clock signal and clock phase information.

Thus, this approach allows the provision of a synchronisation channel (including synchronous clocking, absolute time reference and trigger signals) to a SuperSpeed USB device across USB 2.0 conductors. The synchronisation channel provides a mechanism for greatly increasing the range of a synchronous USB. Background art systems relied on transmission of Start of Frame (SOF) packets on High Speed USB 2.0, but such systems have a limited range. The USB 2.0 standard defines a tiered star topology with 5 layers of expansion through USB hubs, and a maximum cable length per layer of 5 m, hence a total distribution range of 25 m. This is due to the limited communication window for each device under the USB 2.0 protocol, in which there is a communication timeout period for all transactions and the Host Controller must receive a reply from the USB device within a certain period of time from transmission of a request by the Host. According to this aspect of the present invention, synchronisation is not realised by use of USB2 SOF packets. Rather, USB 2.0 communication to the USB device Is disabled and dedicated synchronization information is multiplexed onto the disconnected USB2 conductors. The timeout limits with USB3 are in the order of milliseconds which provides a physical range on the order of tens of kilometres. For all intents and purposes, the physical extent of such a synchronisation channel is determined only by the choice of transport layer.

The USB cable may comprise a plurality of cable segments and a plurality of USB hubs in the downstream path to each of the plurality of USB devices.

The signalling lines are typically in the form of a conducting pair, and may comprise copper cables (which comply with the USB 3.0 specification). Alternatively the signalling lines may comprise hybrid cables with a copper conductor and an optical fibre conductor, or solely optical fibre conductors.

It will be apparent to those skilled in the art that other synchronization information may also be transmitted across the USB D+/D− data signalling lines, and this embodiment does not limit the scope of the synchronization information.

In one embodiment, the synchronization information is distributed across both the USB D+ and USB D− data signalling lines.

In a particular embodiment, the synchronization information is carried by one or more fibre-optic conductors.

In one embodiment, the method includes generating the synchronization information with a USB Host Controller to whose network the SuperSpeed USB device is attached.

In another embodiment, the method includes generating the synchronization information with a USB Hub to whose network the SuperSpeed USB device is attached.

In one embodiment, the upstream connection point is a USB Hub that contains a plurality of connection points for expansion of the USB. The USB Hub may contain a precision timing reference or a local clock synchronised to an external precision timing reference.

In another embodiment, the method includes generating the synchronization information by circuitry at the USB Hub. The synchronization information may be received by circuitry at the USB Hub from an external source, such as a Global Positioning System (GPS) referenced clock source, an atomic clock, an Ethernet device (in the form of, for example, a Network Time Protocol (NTP) or IEEE-1588 Precision Time Protocol (PTP) source), an atomic clock, a Global Positioning Clock source, a wireless synchronisation mechanism, a CompactPCI instrumentation system, a PXI instrumentation system, a VXI instrumentation system or another instrumentation system. In this way, the synchronisation channel is capable of providing a precision timing reference across a widely distributed network, accurate to an external reference clock.

Thus, the present invention allows the synchronisation of SuperSpeed connected USB devices with devices connected via Ethernet (using Network Time Protocol (NTP), the IEEE-1588 synchronisation protocol or any other time source), with devices connected via a PCI bus or compact PCI bus, with devices connected via a PXI (or PXI-express) bus, with devices connected via a VXI or VME bus, with devices connected via wireless means including but not limited to Zigbee or Wireless USB, and with devices connected across any other communication bus.

The synchronization information may be transmitted in a time-domain multiplexed manner, wherein components of the synchronization information occupy respective timeslots within a total communication bandwidth of the synchronisation channel. For example, a periodic clock carrier signal may occupy a first timeslot, an absolute time reference signal a second timeslot and trigger signals a third timeslot.

In one embodiment, the transmitting of the synchronization information in the time-domain multiplexed manner includes at least one timeslot for downstream transmission of clock reference information, at least one timeslot for each attached device to provide upstream transmission of trigger information to a trigger engine, and at least one timeslot for downstream transmission of trigger information to attached devices.

The synchronization information may be in the form of differential signalling across the D+/D− data signalling lines.

Alternatively, the method may include providing the synchronization information by single-ended signalling on the D+ and D− data signalling lines. In this embodiment, the method may include distributing the synchronization information across the data signalling lines. For example, the method may include transmitting a clock carrier signal over a first of the data signalling lines and an absolute time reference signal and trigger signals over a second of the data signalling lines. It will be apparent to those skilled in the art that other configurations for transferring the synchronization information across the data signalling lines are possible.

According to a second broad aspect, the present invention provides a method of synchronising a plurality of SuperSpeed USB devices, the method comprising:

establishing a SuperSpeed communication channel connection from a USB Host to each of the SuperSpeed USB devices, each of the SuperSpeed USB devices being connected by a respective USB link with USB 2.0 D+ and D− data signalling lines (i.e. of the cable) that are disabled or disconnected at an upstream connection point;

multiplexing additional synchronization information onto the D+/D− data signalling lines at the upstream connection point; and demultiplexing the synchronization information from the D+/D− data signalling lines at each of the USB devices;

wherein the synchronization information enables synchronous operation of the USB devices.

Thus, the present invention provides a method of using a system (host controller, cables, hubs and devices) that are fully compliant with the USB3 standard yet allow precision synchronisation while a device connection is maintained at SuperSpeed bandwidth.

Each of the USB cables may comprise a plurality cable segments and a plurality of USB hubs in the downstream path to each of the plurality of USB devices.

The link may comprise a plurality of USB Hubs and USB cables in the downstream path.

In one embodiment, the method includes controlling the SuperSpeed USB devices with the synchronization information.

The method may include using the synchronization information to directly control operation of the USB devices. For example, the method may include using clocking signals to directly control operation of clocked hardware on the USB devices, and using trigger signals to directly operate functions on the USB devices. Alternatively, the method may include using the synchronization information as a carrier signal to which local clocks on each of the respective USB devices are locked.

According to one embodiment, the method further comprises syntonising respective local clocks of the SuperSpeed USB devices to a data rate of a USB Host Controller using the synchronization information. The method may include synchronising the local clocks to a notion of real time.

Thus, syntonised local clocks may clock at the same rate or frequency, but there is generally no known absolute phase relationship or common notion of time across the local clocks. Hence, this arrangement provides the local clocks with a common notion of time. The absolute time reference may be used to synchronise the syntonised local clocks.

According to this embodiment, the method may further comprise:

transmitting an absolute time reference signal in (i.e. as a component of) the synchronization information to the USB devices;

decoding the absolute time reference signal at each of the USB devices and latching the absolute time reference signal into respective absolute time registers at the USB devices; and clocking the absolute time registers by the syntonised local clocks;

whereby the absolute time registers contain the same notion of real time, enable synchronous execution of trigger commands and synchronously control the operation of each of the USB devices.

Thus, according to this embodiment, the USB devices are syntonised, maintain a common notion of time and can synchronously execute trigger commands.

In one embodiment, the absolute time reference signal is a periodic signal. For example, the method may include transmitting the absolute time reference signal at a frequency of 1 Hz, such as on the Coordinated Universal Time (UTC) second boundary. Furthermore, the absolute time reference signal may comprise an encoded signal indicative of a time of day. In this way the USB devices can 'know' the exact absolute time of each of the absolute time reference signals and maintain a common notion of time.

It will be apparent to those skilled in the art that any other time reference may be used and the absolute time reference signal may be transmitted with essentially any desired or required periodicity. It will also be apparent that the absolute time reference signal may be non-periodic provided it comprises an encoded signal that contains a common notion of time for the plurality of USB devices.

The data signalling lines may be copper cables. Alternatively the data signalling lines may comprise a copper conductor and an optical fibre conductor, or solely optical fibre conductors.

In one embodiment, the synchronization information is in the form of differential signalling across the D+/D− data signalling lines, or in the form of single-ended signalling on the D+ and D− data signalling lines.

Alternatively, the method may include providing the synchronization information by single-ended signalling on the D+ and D− data signalling lines. In this embodiment, the method may include distributing the synchronization information in a time-domain multiplexed manner, wherein different elements of the synchronization information occupy respective timeslots within total communication bandwidth. For example, a periodic clock carrier signal may occupy a first timeslot, an absolute time reference signal a second timeslot and trigger signals occupy a third timeslot.

According to this embodiment, the method may include distributing the synchronization information across both the USB D+ and USB D− data signalling lines, such as by transmitting a clock carrier signal on a first of the lines and an absolute time reference signal and trigger signals on a second of the lines.

According to a third broad aspect, the present invention provides a USB device, comprising:

first circuitry adapted to perform at least one SuperSpeed USB device function;

second circuitry adapted to perform at least one non-SuperSpeed USB device function;

a local clock (comprising, for example, a local clock circuit);

synchroniser circuitry; and multiplexing circuitry for placing the second circuitry and upstream non-SuperSpeed USB D+/D− data signalling lines of the USB device in data communication, and operable to selectively connect and disconnect the synchroniser circuitry and the non-SuperSpeed USB D+/D− data signalling lines;

wherein the USB device is enabled as a synchronised USB device when the synchroniser circuitry and the non-SuperSpeed USB D+/D− data signalling lines are connected by the multiplexing circuitry so that the local clock can be synchronised to information contained in the signals carried by the non-SuperSpeed USB D+/D− data signalling lines.

Thus, this aspect provides a synchronised USB device using timing signals on USB 2.0 conductors.

The USB device may include control circuitry for controlling the multiplexing circuitry.

The multiplexing circuitry operable may be operable to selectively connect and disconnect the second circuitry and the non-SuperSpeed USB D+/D− data signalling lines.

In one embodiment, the device further comprises:

a timer;

a third circuitry adapted to decode data communications received and transmitted on the upstream port;

a fourth circuitry adapted to start, stop and reset the timer;

a fifth circuitry adapted to report the timer value to an attached USB Host Controller;

wherein the timer is adapted to measure a latency time in the USB device between receiving a first specific signal and responding by transmitting a second specific signal.

According to a fourth broad aspect, the present invention provides a method for compensating cable-propagation-time induced phase offsets in a plurality of synchronised SuperSpeed USB devices, comprising:

establishing respective SuperSpeed communication channel connections from a USB Host to the respective SuperSpeed USB devices, each of the connections comprising a respective USB cable;

disabling or disconnecting USB2 D+/D− data signalling lines of the respective USB cables at upstream connection points of the respective USB cables;

multiplexing synchronization information (such as clocking, absolute time reference and trigger signals) onto the D+/D− signalling lines at the upstream connection points;

demultiplexing the synchronization information from the D+/D− data signalling lines at each of the USB devices;

transmitting propagation timing signals on the D+/D− data signalling lines to the USB devices;

receiving and decoding response signals from the USB devices generated in response to the propagation timing signals;

measuring respective time intervals between transmission of the propagation timing signals and reception of the response signals for each of the USB devices;

determining relative downstream propagation times for each of the USB devices;

designating one of the USB devices as a temporal reference device;
determining a respective difference between the relative downstream propagation time of the temporal reference device and each of the USB devices other than the temporal reference device;
syntonising or locking respective clocks local to the USB devices in frequency and phase to the synchronization information;
determining respective phases of the local clocks with respect to the local clock of the temporal reference USB device;
determining respective temporal adjustments or phase shifts of the local clocks required to put the local clocks substantially in phase (noting that not all of the USB devices may be determined to require a temporal adjustment or phase shift);
transmitting the temporal adjustments or phase shifts (such as from a USB host) to the respective USB devices (noting that this may mean that some of the USB devices may not receive a temporal adjustment or phase shift, if no temporal adjustment or phase shift was determined as required in the previous step); and
phase adjusting the respective local clocks according to the respective temporal adjustment or phase shift transmitted thereto.

Thus, this aspect provides a time-delay-loop-back signal on the D+/D− data signalling lines.

Furthermore, the temporal adjustment is valid for compensating the cable-propagation-time for all of the synchronization information. Therefore providing a generic phase adjustment for all of the synchronization information allows synchronisation of clocking signals, absolute time reference signals, trigger signals and any other form of synchronization information for each of the USB devices.

Each of the connections may comprise a plurality cable segments and a plurality of USB hubs in the downstream path to the respective USB devices.

The time interval comprises three components: a downstream propagation time, an upstream propagation time and a latency in the respective USB device due to generation of the response to the propagation timing signal. Signal propagation times across the USB cables may generally be treated as symmetrical and the latency should have a uniform value for all of the USB devices of like characteristics. The signal propagation times are therefore expected to be exactly half of the time interval for each of the USB devices, plus some constant value due to the latency. As a result, the constant latency cancels out when determining the relative downstream propagation times.

According to one embodiment, the method further comprises each of the USB devices:
decoding the demultiplexed synchronization information;
starting a respective timer on receipt of a first decoded specific signal;
responding to receipt of the decoded specific signal by transmitting a second specific signal upstream toward a USB Host Controller;
stopping the respective timer upon generation of the response signal; and
determining a latency time in the respective USB device between receiving the first decoded specific signal and responding by transmitting the second specific signal.

In a fifth broad aspect, the present invention provides a method of synchronising a SuperSpeed USB device to the USB network to which the SuperSpeed USB device is attached, comprising:
establishing a SuperSpeed communication channel to the SuperSpeed USB device;
establishing a non-SuperSpeed communication channel to the USB device; and
providing a non-SuperSpeed synchronisation channel across the non-SuperSpeed communication channel;
wherein both of the SuperSpeed and non-SuperSpeed communication channels are operable at the same time; and
USB communication occurs across SuperSpeed at the same time while synchronisation is occurring across non-SuperSpeed USB.

Thus, USB Hub is provided that allows both SuperSpeed and non-SuperSpeed connections to a single device, permitting including synchronous clocking, absolute time reference and trigger signals.

According to this aspect, the invention also provides a method of synchronising a non-SuperSpeed synchronisation channel, comprising:
a method for locking, or syntonising, the local clock of each of a plurality of USB Hubs and non-SuperSpeed USB devices to substantially the same frequency;
a method for measuring the roundtrip propagation time of non-SuperSpeed signals from said highest possible USB Hub (top of network) to each of said USB Hubs and non-SuperSpeed USB devices;
a method for determining relative downstream propagation times for non-SuperSpeed signals to each of said USB Hubs and non-SuperSpeed USB devices;
a method for synchronising, or adjusting the phase of, each of said plurality of local clocks resulting in said plurality of local clocks of said plurality of USB hubs and non-SuperSpeed USB devices contained in said non-SuperSpeed synchronisation channel being syntonised and substantially in phase; and
a method for providing each of said plurality of said USB devices with a common notion of time.

Preferably the method of locking or syntonising the local clock of a USB Hub or non-SuperSpeed device, comprises:
observing a USB data stream local to said USB hub or said non-SuperSpeed USB device;
decoding a periodic signal structure from the USB data stream;
generating an event signal local to the USB Hub or the non-SuperSpeed USB device corresponding to decoding the periodic data structure from said USB data stream (and hence itself periodic);
locking the frequency of the local clock to the periodic event signal.

Thus, the periodic event signal provides a reference to which the phase-locked-loop local clock synchronises its frequency.

Preferably the periodic signal structure comprises one or more OUT tokens, IN tokens, ACK tokens, NAK tokens, STALL tokens, PRE tokens, SOF tokens, SETUP tokens, DATA0 tokens, DATA1 tokens, or programmable sequences bit patterns in the USB data packets.

Preferably the non-SuperSpeed USB device contains either a HighSpeed device function or a FullSpeed device function. Preferably the non-SuperSpeed USB device is adapted to synchronise the local clock to a periodic data structure in the non-SuperSpeed communication channel, such as the USB SOF packet token.

In a sixth broad aspect, the present invention provides an apparatus for providing a synchronisation channel to an attached SuperSpeed USB device comprising:
first circuitry, adapted to establish a SuperSpeed USB connection to the USB device;

second circuitry, adapted to establish a non-SuperSpeed USB connection to the USB device; and third circuitry, adapted to provide a non-SuperSpeed synchronisation channel across the non-SuperSpeed communication channel;

wherein the first circuitry and second circuitry are operable at the same time.

In one embodiment, the apparatus is adapted to permit simultaneous operation of both SuperSpeed and non-SuperSpeed connections to the USB device and to no other USB device.

The apparatus may also comprise fourth circuitry for determining whether the attached USB device has SuperSpeed USB communication capability, and fifth circuitry for determining whether the attached USB device has a non-SuperSpeed USB synchronisation capability operable synchronously with the SuperSpeed USB communication capability.

Thus, a USB Hub is provided that allows both SuperSpeed and non-SuperSpeed connections to a single device.

In one embodiment, the apparatus comprises USB Hub circuitry adapted for communicating toward a USB Host Controller through an upstream port and communicating toward one or more USB devices through one or more respective downstream ports, to allow expansion (of the USB) to the USB devices attached to the downstream ports such that each of the USB devices can contain the synchronisation channel.

In one embodiment, the second circuitry (viz. for establishing the non-SuperSpeed USB connection) allows a fully compliant non-SuperSpeed USB communication connection. In another embodiment, the second circuitry allows downstream communication of only signal packets to the USB device. In this way a periodic signal structure such as the USB Start of Frame (SOF) packet may be delivered to the USB device in a preferred non-SuperSpeed USB synchronisation scheme.

In one embodiment, the synchronization information carried on the non-SuperSpeed synchronisation channel (D+/D− signal lines) is time domain multiplexed, so that different components of the synchronization information are transmitted in dedicated windows of time. In a preferred embodiment, the D+/D− signalling bandwidth is apportioned to include dedicated timeslots for downstream clock reference information, upstream trigger information for each attached device and downstream trigger information.

In such an embodiment the majority of the cycle time is dedicated to downstream clock reference information. Clock reference information is used by each attached device to syntonise their respective local clocks. A further timeslot is provided for each device to transmit information about the occurrence of their respective trigger events back up to the trigger system for distribution to other devices in yet another timeslot.

The trigger system may be employed at the lowest point in the network tree common to all devices, or at the top of the tree at Host Controller level. Preferably said trigger system would be employed at a hardware level and would not require intervention of the operating system for minimum latency.

It should also be understood that when devices are first connected to the bus, a propagation time measurement process needs to be undertaken and an additional timeslot may be provided for that process and the accompanying phase offset data. In general an additional timeslot may be provided to each attached device in order to allow temporal configuration data exchange.

According to this aspect, the invention also provides an apparatus for synchronising a plurality of attached SuperSpeed USB devices, the apparatus comprising:

circuitry adapted to perform a SuperSpeed USB Hub function, the circuitry providing an upstream port and a plurality of downstream ports;

circuitry adapted to perform a non-SuperSpeed USB Hub function the circuitry providing an upstream port and a plurality of downstream ports;

synchroniser circuitry comprising a local clock, and adapted to generate synchronization information, the synchronization information comprising clock signals, a notion of time and trigger signals;

circuitry adapted to observe both the SuperSpeed and non-SuperSpeed upstream ports and to lock the local clock to a data structure contained on the upstream port;

a respective multiplexer for each downstream port of said USB Hub function circuitry, said plurality of multiplexers adapted to multiplex either signals from the non-SuperSpeed USB Hub function or from the synchroniser onto the each of the plurality of downstream ports of the apparatus; and controller circuitry adapted to control the state of the plurality of multiplexers;

wherein the controller circuitry is adapted to control the plurality of multiplexers to connect either the non-SuperSpeed Hub function downstream ports or the synchroniser output to the respective downstream ports of the apparatus.

The controller circuitry may comprises a USB device attached to one of the downstream ports of the circuitry adapted to perform the SuperSpeed USB Hub function.

In a seventh broad aspect, the present invention provides an extended range synchronised SuperSpeed USB device, comprising:

SuperSpeed USB communication circuitry;

synchronisation circuitry;

a multiplexer for wavelength division multiplexing of SuperSpeed USB communication information and synchronization information onto a single optical fibre or optical fibre cable; and a connector for connection of the optical fibre or optical fibre cable;

wherein the optical fibre or optical fibre cable supports high speed communication across distances greater than 3 m.

The aspect also provides a system for operation of synchronised SuperSpeed USB devices over links greater than 3 m in length, comprising:

multiplexing SuperSpeed communication information and synchronization information to and from an optical fibre cable at a first USB node; and demultiplexing the SuperSpeed communication information and synchronization information from and to the optical fibre cable respectively at a second USB node.

According to this aspect there is further provided a method of operating synchronised SuperSpeed USB devices over a SuperSpeed USB link greater than 3 m in length, the method comprising:

connecting a first SuperSpeed communication channel of a first USB node to a first node of a first multiplexer;

coupling first synchronization information of the first USB node to a second node of a first multiplexer;

multiplexing signals at the first and second nodes of the first multiplexer onto separate optical channels;

transmitting the plurality of optical channels into an optical fibre;

receiving the plurality of optical channels at a second USB node of the SuperSpeed USB link from the optical fibre;

demultiplexing a second SuperSpeed communication channel from a first node of a second multiplexer;

demultiplexing second synchronization information from a second node of a second multiplexer;

utilising the first and second SuperSpeed communication channels to communicate between the first and second nodes;

synchronising the operation of the first and second nodes using information contained in the synchronisation channel;

wherein the USB devices comprise or are located at the respective USB nodes, and the USB devices operate in synchrony at distances greater than 3 m.

The first and second USB nodes may comprise, for example, a USB Host and USB device, or a USB Host and USB Hub, or a USB Hub and USB device.

In one embodiment, the multiplexing comprises wavelength division multiplexing of the SuperSpeed communication information and the first synchronization information. The wavelength division multiplexing may utilise the 1310 nm and 1550 nm optical bands with single or quasi-single mode fibre. The wavelength division multiplexing may utilise the 1310 nm optical band with single or quasi-single mode fibre. In a particular embodiment, the wavelength division multiplexing utilises the 1550 nm optical band with single or quasi-single mode fibre.

In one embodiment, the information contained in the synchronisation channel comprises information multiplexed onto unused non-SuperSpeed D+/D− signals.

According to this aspect, there is also provided a method of operating a synchronised SuperSpeed USB device over a SuperSpeed USB link greater than 3 m in length, the method comprising:

connecting a first SuperSpeed communication channel of a first USB node to a first node of a multiplexer of a first active optical connector;

coupling first synchronization information of the first USB node to a second node of a multiplexer of a first active optical connector;

multiplexing signals at the first and second nodes of the multiplexer of the first active optical connector onto separate optical channels;

transmitting the plurality of optical channels from the first active optical connector onto an optical fibre;

receiving the plurality of optical channels from the optical fibre at a second active optical connector;

demultiplexing a second SuperSpeed communication channel from a multiplexer of the second active optical connector into a second USB node;

demultiplexing second synchronization information from a second node of a multiplexer of the second active optical connector into the second USB node;

utilising the first and second SuperSpeed communication channels to communicate between the first and second nodes of the SuperSpeed USB link;

utilising the first and second synchronization information to synchronise the operation of the first and second nodes of the SuperSpeed USB link.

In one embodiment, the first and second synchronization information comprises information multiplexed onto unused non-SuperSpeed D+/D− signals.

In a certain embodiment, the first and second USB nodes include standard SuperSpeed USB connectors and the active optical connectors conform to the SuperSpeed USB connector standard.

The multiplexing may comprise wavelength division multiplexing of the SuperSpeed communication information and the synchronization information. The wavelength division multiplexing may utilise the 1310 nm and 1550 nm optical bands with single or quasi-single mode fibre. The wavelength division multiplexing may utilise the 1310 nm optical band with single or quasi-single mode fibre. In a particular embodiment, the wavelength division multiplexing utilises the 1550 nm optical band with single or quasi-single mode fibre.

It should be noted that all the various features of each of the above aspects of the invention can be combined as suitable and desired.

Furthermore, it should be noted that the invention also provides apparatuses and systems arranged to perform each of the methods of the invention described above.

In addition, apparatuses according to the invention can be embodied in various ways. For example, such devices could be constructed in the form of multiple components on a printed circuit or printed wiring board, on a ceramic substrate or at the semiconductor level, that is, as a single silicon (or other semiconductor material) chip.

BRIEF DESCRIPTION OF THE DRAWINGS

In order that the present invention may be more clearly ascertained, embodiments will now be described, by way of example, with reference to the accompanying drawing, in which.

DETAILED DESCRIPTION OF THE INVENTION

Figure 1:
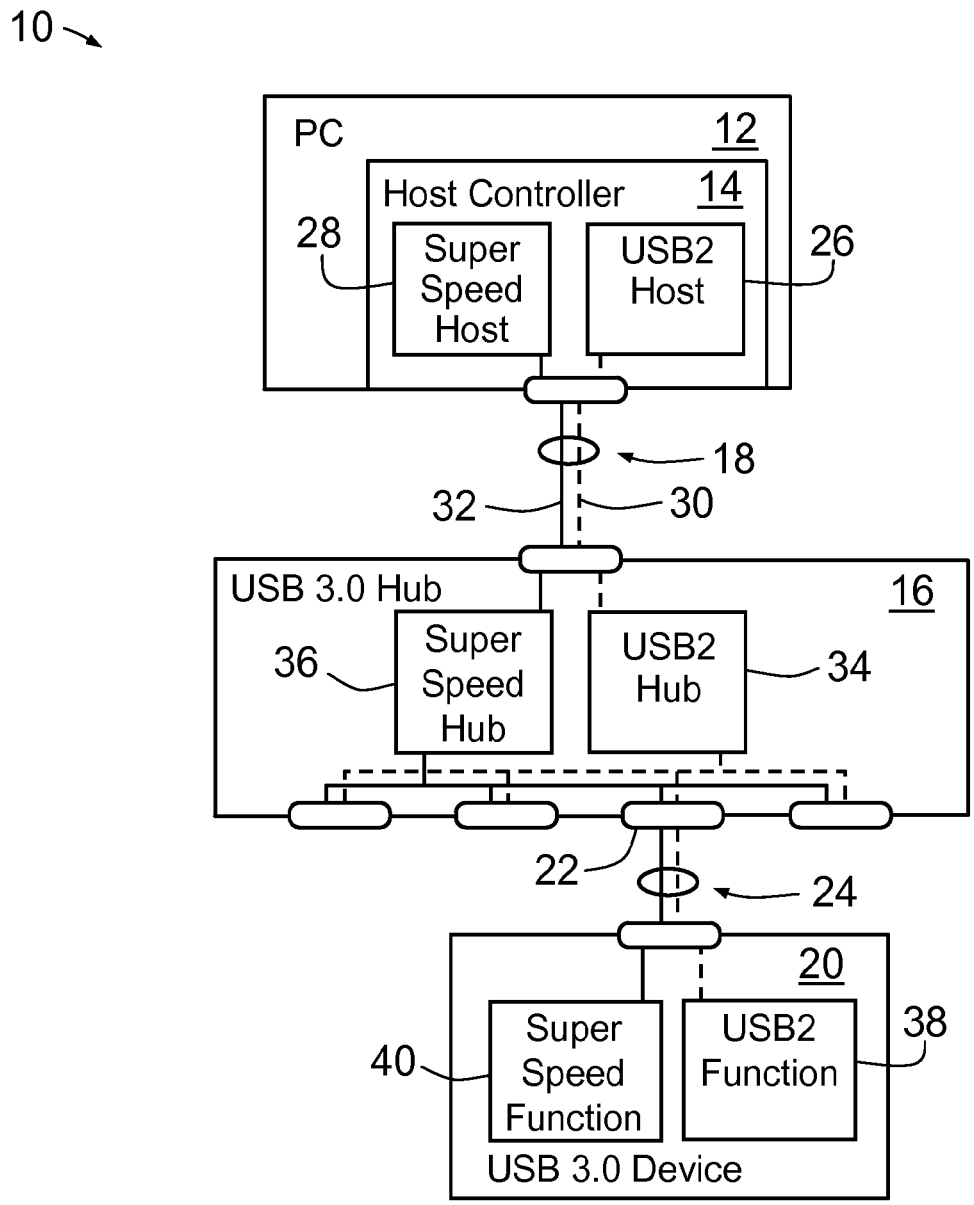
FIG. 1 is a schematic diagram of the dual-bus architecture of USB3 according to the background art.
Figure 2:
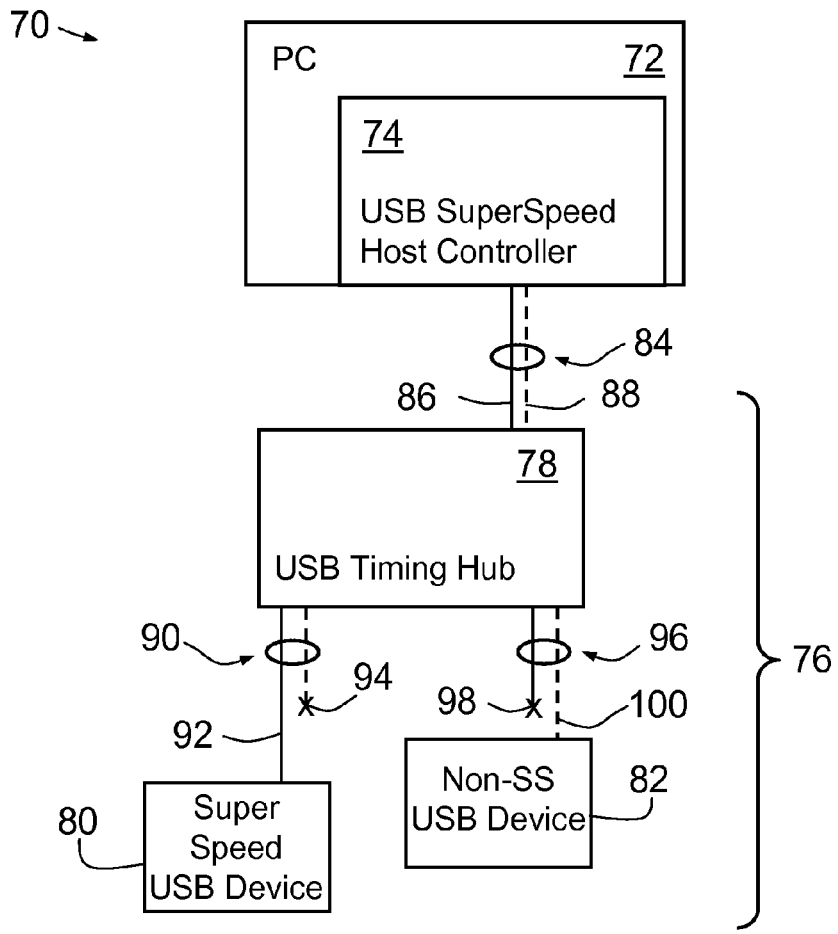
FIG. 2 is a schematic diagram of a synchronised USB according to an embodiment of the present invention, containing both SuperSpeed and non-SuperSpeed USB devices.

A synchronised USB according to a first embodiment of the present invention is shown schematically at 70 in FIG. 2, provided in a personal computer (PC) 72. PC 72 includes a SuperSpeed USB Host Controller 74 that is connected to a network 76 containing a SuperSpeed USB Timing Hub 78, a SuperSpeed USB device 80 and a non-SuperSpeed USB device 82. USB Host Controller 74 is connected to USB Timing Hub 78 by compound USB cable 84 comprising SuperSpeed conductors 86 and non-SuperSpeed conductors 88.

USB Timing Hub 78 supports attachment of both a SuperSpeed USB device 80 and non-SuperSpeed USB device 82, so both SuperSpeed conductors 86 and non-SuperSpeed conductors 88 carry signals between SuperSpeed USB Host Controller 74 and USB Timing Hub 78.

SuperSpeed USB device 80 is connected to USB Timing Hub 78 by SuperSpeed-compliant compound USB cable 90, comprising SuperSpeed conductors 92 and non-SuperSpeed conductors 94. As device USB 80 is a SuperSpeed USB device, USB Timing Hub 78 turns off non-SuperSpeed data traffic to conductors 94, so the connection between SuperSpeed device 80 and USB Timing Hub 78 is provided by SuperSpeed conductors 92 alone. Non-SuperSpeed USB device 82 is connected to USB Timing Hub 78 by SuperSpeed-compliant compound USB cable 96, comprising SuperSpeed conductors 98 and non-SuperSpeed conductors 100. There are no signals across the SuperSpeed USB conductors 98 of cable 96 while a data connection is being made to Non-SuperSpeed USB device 82 by the non-SuperSpeed conductors 100.

In this example, SuperSpeed conductors 92 (of compound USB cable 90) between USB Timing Hub 78 and SuperSpeed USB device 80 are adapted to provide a SuperSpeed synchronisation channel, whilst non-SuperSpeed cable segment 100 (of compound USB cable 96) between USB Timing Hub 78 and non-SuperSpeed USB device 82 can be said to provide a non-SuperSpeed synchronisation channel.

Figure 3:
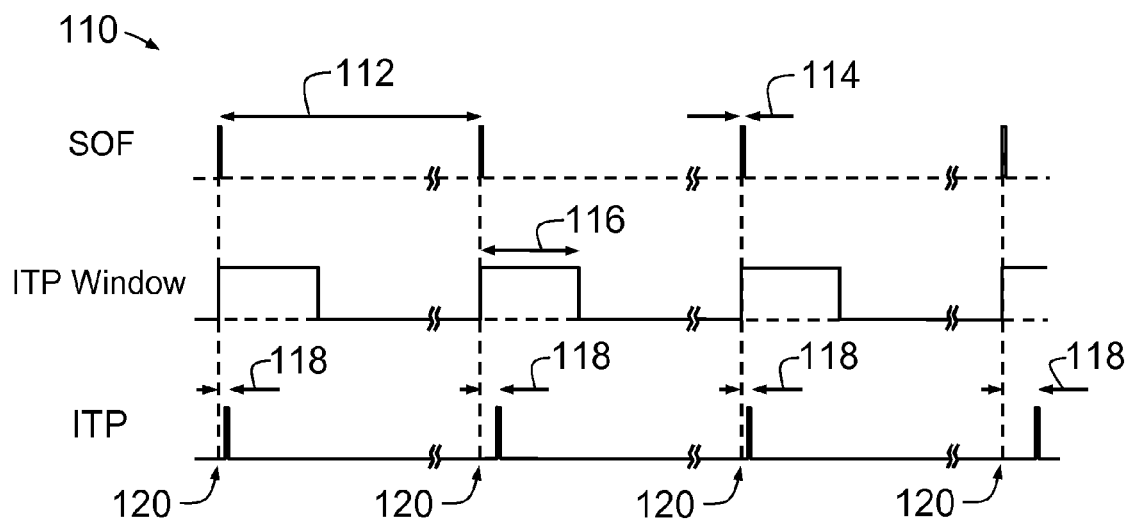
FIG. 3 is a schematic diagram of the relative timing of periodic timing signals used for synchronisation of SuperSpeed and non-SuperSpeed USB devices of the synchronised USB of FIG. 2.

According to this embodiment, SuperSpeed USB device 80 is synchronised to non-SuperSpeed USB device 82. Frames in non-SuperSpeed USB traffic have a substantially constant phase relationship with the Isochronous SuperSpeed Timestamp packets. FIG. 3 is a schematic representation of an exemplary timing diagram at 110 of timing signal traffic through USB Timing Hub 78 of FIG. 2 showing the relationships between timing signals of a SuperSpeed and non-SuperSpeed synchronisation channel.

Referring to FIG. 3, bus interval 112—defined as a 125 µs period—is common to both SuperSpeed and non-SuperSpeed busses. The typical periodic signal structure chosen for synchronisation of a non-SuperSpeed synchronisation channel is the Start of Frame (SOF) packet, which occurs once every bus interval at the bus interval boundary. There is a very tight tolerance 114 in transmission of a Start of Frame packet (see upper register of FIG. 3): Start of Frame packets must be transmitted within nanoseconds of the bus interval boundary.

By contrast, a SuperSpeed synchronisation channel has a very loose tolerance 116 on the Isochronous Timestamp Packet (ITP) Window (middle register of FIG. 3). The ITP Window allows transmission of an ITP anywhere in the region of 8 µs following a bus interval boundary. This results in significant timing jitter in transmission of the Isochronous Timestamp Packet (time elapsed 118 since respective bus interval boundary 120). The Isochronous Timestamp Packet (see lower register of FIG. 3) also contains a timestamp of the time elapsed from the bus interval boundary to the transmission of the Isochronous Timestamp Packet. This mechanism allows the attached USB device to keep track of the Host Controller time.

Nevertheless, the two time signatures predominantly used in this embodiment have a known phase relationship allowing accurate synchronisation of the SuperSpeed and non-SuperSpeed synchronisation channels.

Figure 4A:
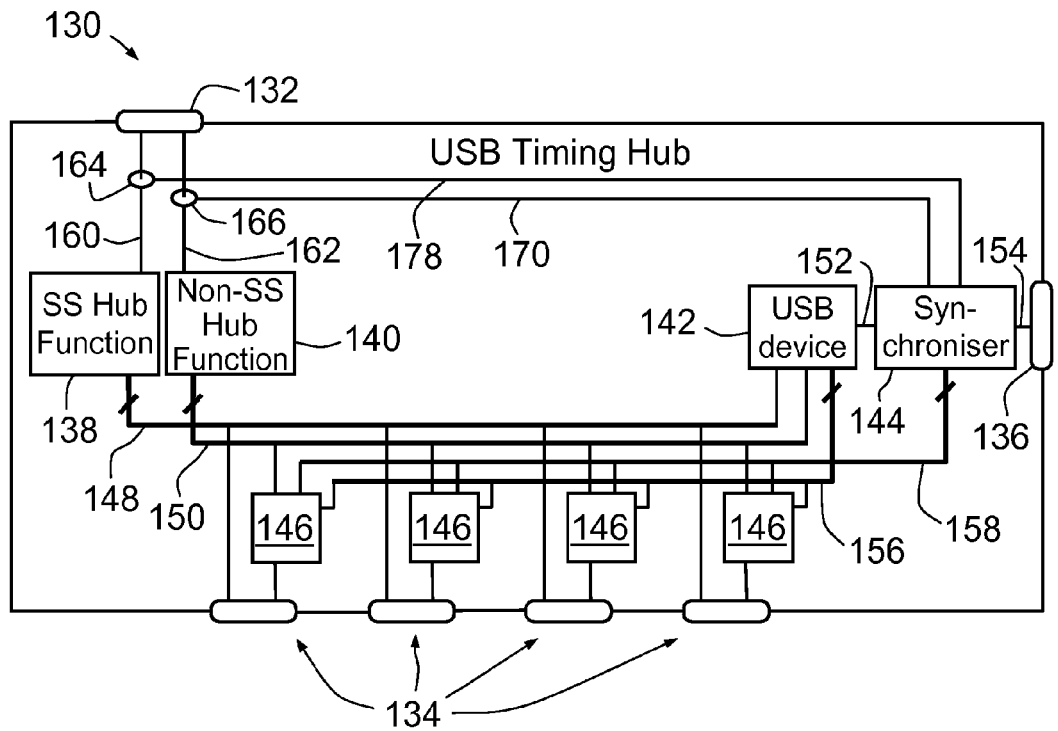
FIG. 4A is a schematic diagram of a USB Timing Hub according to an embodiment of the present invention.

In another embodiment, the present invention provides a system for synchronising a plurality of SuperSpeed and non-SuperSpeed channels. FIG. 4A is a schematic representation a SuperSpeed USB Timing Hub 130 according to this embodiment. USB Timing Hub 130 has an upstream port 132 for communicating with a USB Host Controller, a plurality of downstream ports 134 for communicating towards USB devices. Only four downstream ports 134 are shown for simplicity, but it should be understood that USB Timing Hub 130 may have more or fewer downstream ports. USB Timing Hub 130 also has an external timing port 136 for communicating timing information between USB Timing Hub 130 and an external timing device. Such an external timing device may be a synchronised instrumentation system, such as a PXI, PXI-express, Ethernet, LXI or VXI system, or any other system capable of providing or using timing information.

USB Timing Hub 130 has a SuperSpeed Hub function 138, a non-SuperSpeed Hub function 140, a USB device 142, a synchroniser 144 and a plurality of multiplexers 146. Optionally, SuperSpeed Hub function 138 and non-SuperSpeed Hub function 140 may be combined in a compound device.

USB device 142 may be either a SuperSpeed or a non-SuperSpeed USB device and is connected to a SuperSpeed Data Bus 148 and a Non-SuperSpeed Data Bus 150. Each downstream connection of SuperSpeed Hub function 138 and non-SuperSpeed Hub function 140 respectively (including the one that USB Device 142 is connected to) is a parallel connection and has only been depicted in FIG. 4A as a bus for clarity.

USB device 142 can be used to control certain parameters of synchroniser 144 through communication channel 152, in turn communicating timing information between an upstream USB Host Controller and the aforementioned external timing device connected to external timing port 136, via external timing channel 154 that couples synchroniser 144 and external timing port 136. A respective multiplexer 146 is allocated to each of external downstream USB ports 134, is controlled by USB Device 142 via a control bus 156 to either pass non-SuperSpeed communication 150 from non-SuperSpeed USB Hub 140 to each of downstream ports 134 or to instead pass timing information and signals (via a pass timing information and signals bus 158) from synchroniser 144 to each of downstream ports 134. Timing information and signals bus 158 provides a dedicated parallel connection to each multiplexer 146 and contains clock, trigger, loop-time measurement signals and a notion of time, among other timing information.

SuperSpeed Hub function 138 and non-SuperSpeed Hub function 140 are coupled to upstream port 132 by, respectively, first and second upstream channels 160, 162, which are provided with respective first and second detection points 164, 166. Synchroniser 144 observes SuperSpeed USB data traffic and non-SuperSpeed USB data traffic at detection points 164, 166 respectively via first and second channels 168, 170, so that synchroniser 144 can synchronise a local clock of synchroniser 144 (not shown) to the USB Host Controller's notion of time. Optionally, synchroniser 144 may observe only non-SuperSpeed USB data traffic (via second channel 170), which is certain to exist if USB Device 142 is a non-SuperSpeed device.

Synchroniser 144, furthermore, is able to adjust its notion of time by phase adjusting its local clock and absolute time registers based on a cascading synchronisation approach, being below a further SuperSpeed or non-SuperSpeed USB Timing Hub in the USB network tree.

Figure 5A:
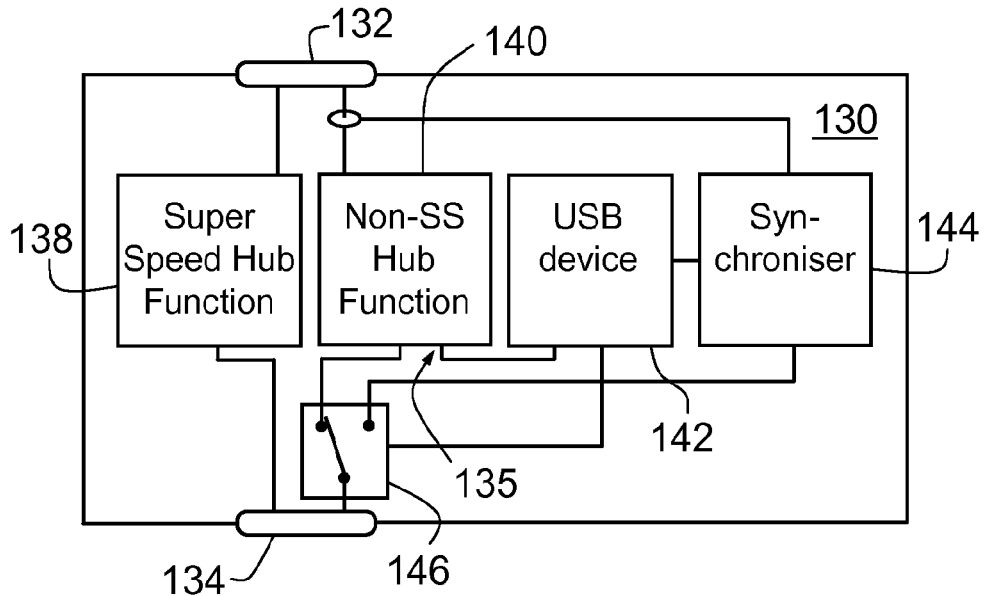
FIG. 5A is a schematic diagram of a particular state (in which a SuperSpeed synchronisation channel is provided) of a simplified version of the USB Timing Hub of FIG. 4A.
Figure 5B:
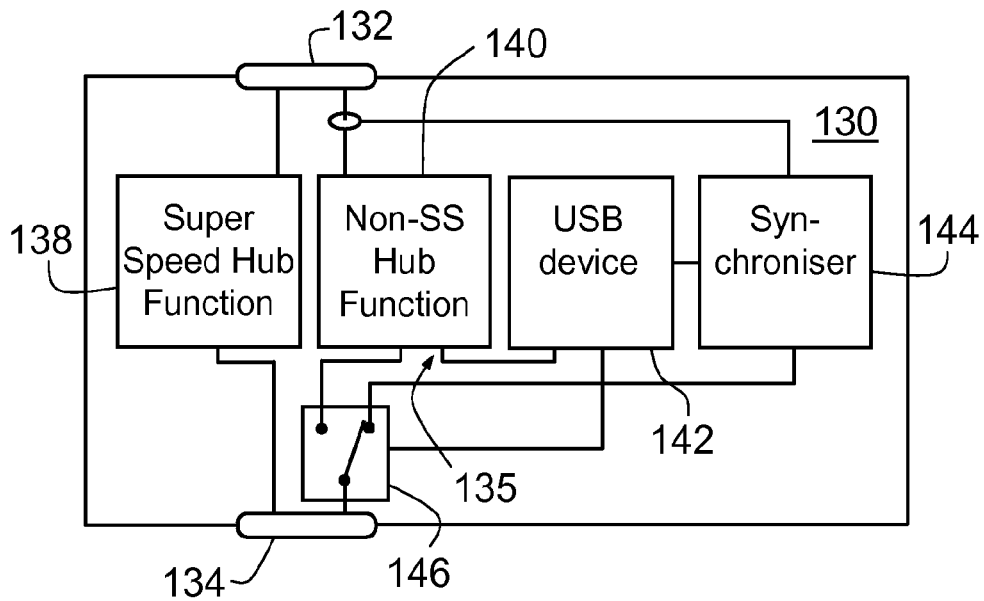
FIG. 5B is a schematic diagram of a particular state (in which a non-SuperSpeed synchronisation channel is provided) of a simplified version of the USB Timing Hub of FIG. 4A.

In a variant of this embodiment, synchroniser 144 is configured to detect non-SuperSpeed data streams at second detection point 166 and pass a direct copy downstream through an appropriately configured multiplexer 146 (configured as shown in FIG. 5B) to a downstream USB Device. This allows a USB device to communicate across a SuperSpeed communication channel and yet still receive periodic data structures on the non-SuperSpeed synchronisation channel. Furthermore, upstream signals from such an attached USB device would need to be routed through synchroniser 144 and back into the upstream signal path through second detection point 166 (possibly via an optional multiplexer—not shown—located at second detection point 166).

Figure 4B:
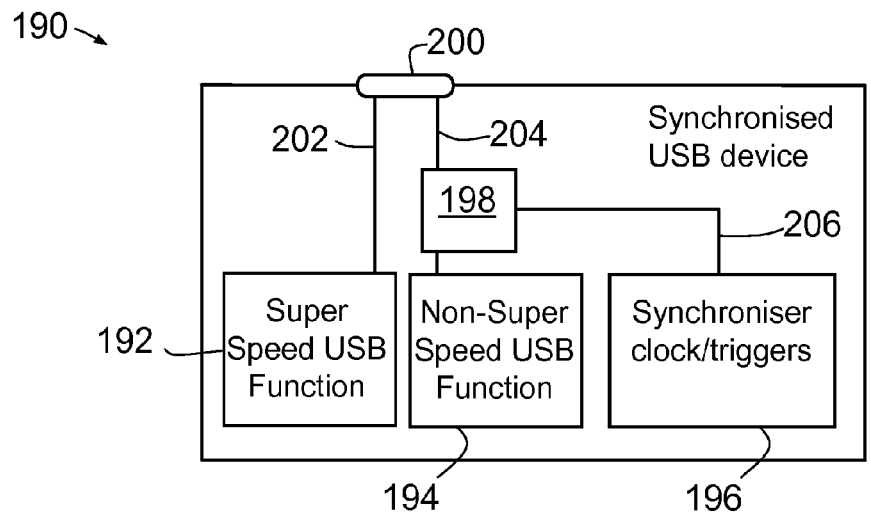
FIG. 4B is a schematic diagram of a synchronised USB device according to an embodiment of the present invention.

FIG. 4B is a schematic view of a synchronised USB device 190 according to another embodiment of the present invention. Synchronised USB device 190 has a SuperSpeed USB Function 192, a non-SuperSpeed USB Function 194, a synchroniser 196 and a multiplexer 198.

Synchronised USB device 190 is connected to a USB (not shown) via connector 200. SuperSpeed USB Function 192 receives SuperSpeed Data Signals via a first channel 202 from connector 200, and receives non-SuperSpeed Data Signals from connector 200 pass along second channel 204 (comprising USB D+/D− signalling lines), via multiplexer 198, to non-SuperSpeed USB Function 194. Multiplexer 198 may also intercept non-SuperSpeed USB Signals on second channel 202 and route them via third channel 206 to synchroniser 196, to enable USB Device 190 as a synchronised USB device. Alternatively, multiplexer 198 may replicate non-SuperSpeed USB Data Signals on second channel 204 onto third channel 206, thereby allowing non-SuperSpeed USB Data Signals on second channel 204 to be received simultaneously by both non-SuperSpeed USB Function 194 and synchroniser 196.

In order to more clearly describe the operation of USB Timing Hub 130 of FIG. 4A, simplified examples of USB Timing Hub 130 are shown at 210 in FIG. 5A and at 210' in FIG. 5B. These figures depict only one representative downstream port 134 for simplicity (though plural downstream ports would typically be provided in practice), and the same reference numerals have been used as in FIG. 4A. USB device 142 is depicted, in these examples, as a non-SuperSpeed USB device, so is internally connected to a downstream port 135 of non-SuperSpeed USB Hub function 140.

Referring to FIG. 5A, in normal operation of downstream port 134, USB device 142 controls the state of multiplexer 146 which, as depicted in this figure, is configured to pass non-SuperSpeed USB data signals from non-SuperSpeed USB Hub function 140 to downstream port 134. Under normal conditions, both SuperSpeed and non-SuperSpeed signals are provided to downstream port 134 to allow connection of either a SuperSpeed or non-SuperSpeed device downstream.

FIG. 5B is a schematic depicted of the configuration of USB Timing Hub 130 configured to provide a SuperSpeed synchronisation channel across the non-SuperSpeed USB D+/D− data signalling lines of a USB. This scenario will have been established by a SuperSpeed USB device (not shown), connected to and downstream of downstream port 134, requesting provision of such a synchronisation channel of the Host Controller, which in turn requests that USB device 142 establish this configuration for downstream port 134. Synchroniser 144 then has complete control of the downstream D+/D− data signalling lines to the attached, aforementioned SuperSpeed USB device. Synchroniser 144 is then able to transmit and receive from downstream port 143 via multiplexer 146 any combination of periodic clock carrier signals, dedicated clock signals, cable loop-time measurement signals, trigger signals, absolute time reference signals, data containing the absolute time of any given absolute time reference signal or any other signals required to synchronise the local clock or operation of the downstream SuperSpeed USB device to a notion of time derived from either the Host Controller or the external notion of time derived from external timing port 136 (see FIG. 4A).

Figure 6:
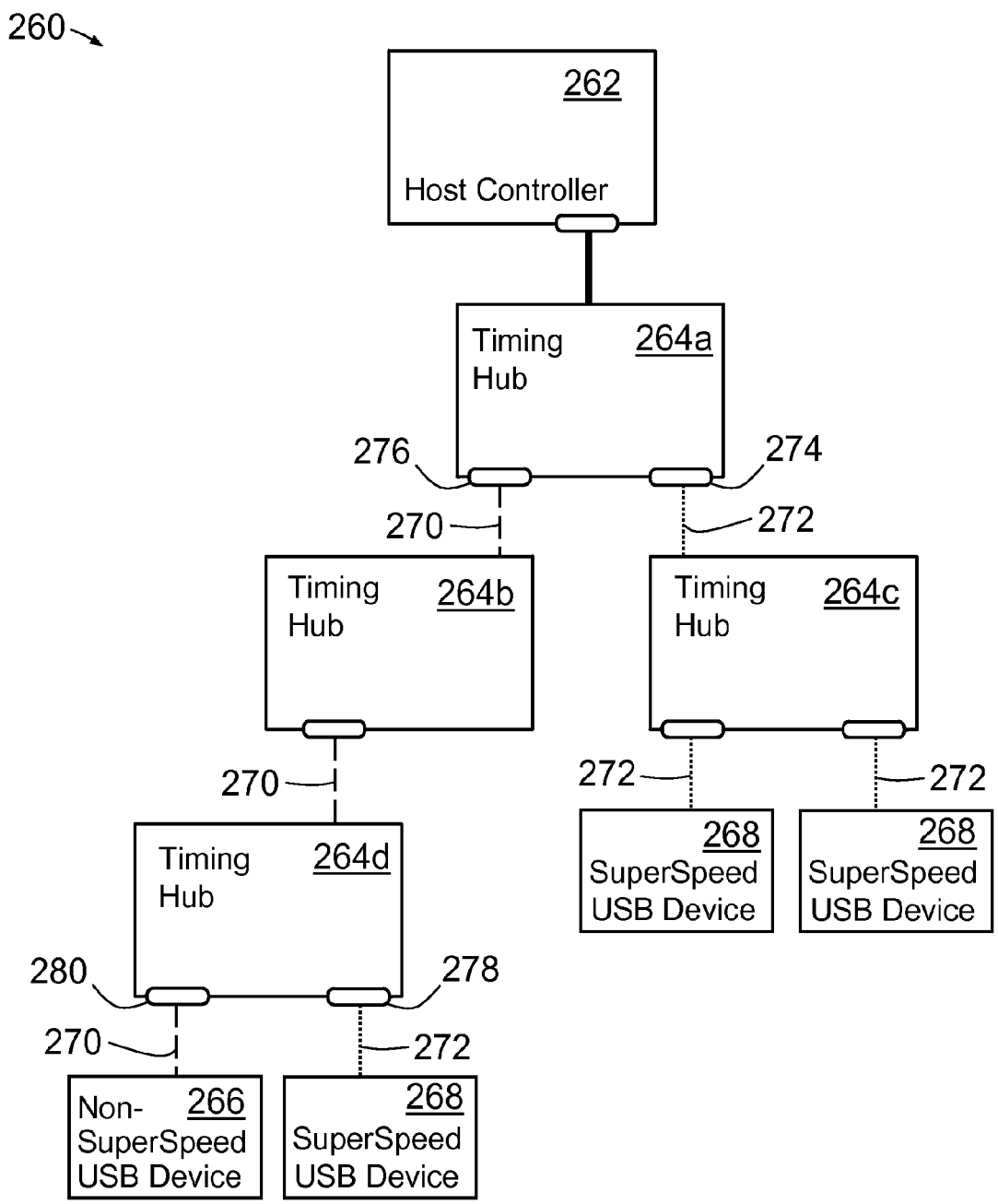
FIG. 6 is a schematic representation of a mixed SuperSpeed and non-SuperSpeed synchronised USB network according to an embodiment of the present invention.

FIG. 6 is a schematic representation of a mixed SuperSpeed and non-SuperSpeed synchronised USB network 260 according to a further embodiment of the present invention. USB network 260 includes a Host Controller 262, first, second, third and fourth USB Timing Hubs 264a, 264b, 264c and 264d, a non-SuperSpeed USB device 266 and a plurality of SuperSpeed USB devices 268.

The mixed device nature of USB network 260 means that non-SuperSpeed USB device 266 is synchronised across a non-SuperSpeed synchronisation channel 270 while SuperSpeed USB devices 268 are synchronised across SuperSpeed synchronisation channels 272. The network branch spanned by downstream Hub port 274 (of USB Timing Hub 264a) contains only SuperSpeed USB devices 268, so all synchronisation channels in this branch are SuperSpeed synchronisation channels 272. By contrast, the network branch spanned by downstream Hub port 276 (of USB Timing Hub 264a) contains both SuperSpeed and non-SuperSpeed USB devices. Downstream Hub port 276 therefore provides a non-SuperSpeed synchronisation channel, which becomes a SuperSpeed synchronisation channel further downstream at port 278 (of USB Timing Hub 264d) to the attached SuperSpeed USB device.

The network branch spanned by Hub port 274 (of USB Timing Hub 264a) may contain a non-SuperSpeed synchronisation channel, but the presence of only SuperSpeed USB devices in that branch allows a SuperSpeed synchronisation channel to be used.

Figure 7:
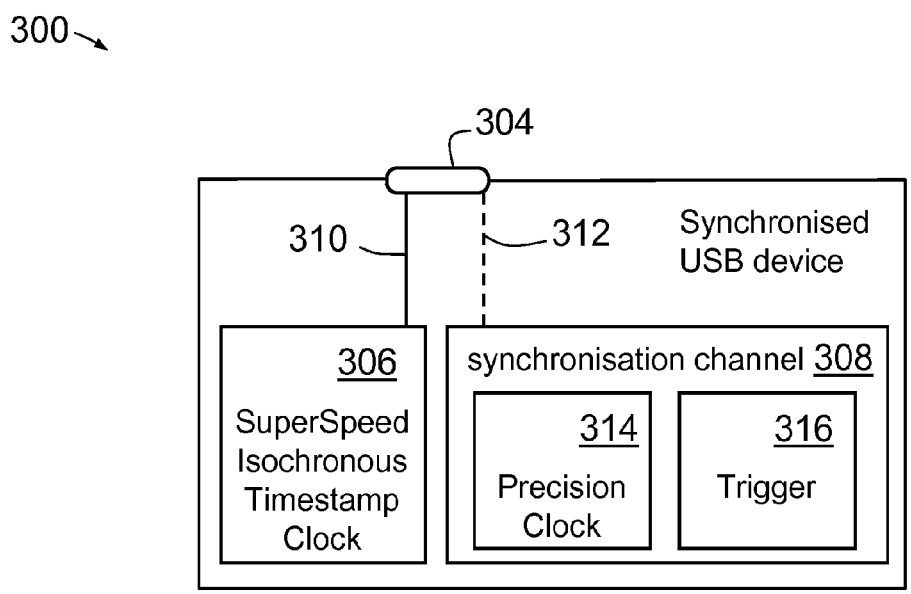
FIG. 7 is a logical representation of the synchronisation regimes of a synchronised USB device of FIG. 4B.

FIG. 7 is a logical representation of the synchronisation domains of a synchronised USB device 300. Synchronised USB device 300 includes an upstream port 304, an Isochronous Timestamp Packet synchronised clock 306 and additional synchronisation channel 308. Isochronous Timestamp synchronised clock 306 is synchronised across SuperSpeed USB signal lines 310 while additional synchronisation channel 308 is synchronised across non-SuperSpeed D+/D− signal lines 312. Additional synchronisation channel 308 contains a precision clock 314 and a trigger or trigger circuitry 316.

Figure 8:
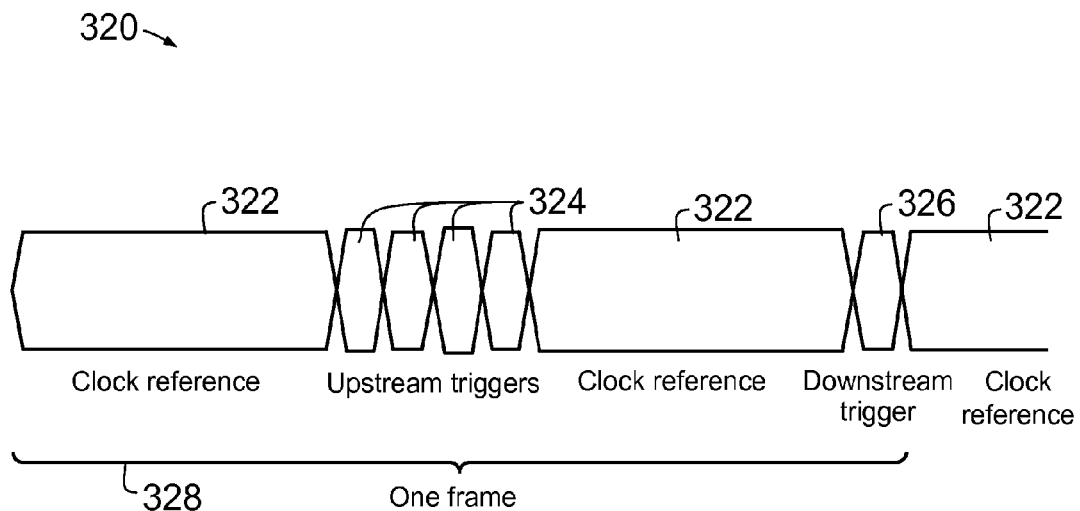
FIG. 8 is a schematic representation of the time domain multiplexed architecture of a synchronisation channel according to an embodiment of the present invention.

FIG. 8 is a schematic representation 320 of a typical timeslot division of a single frame 328 of synchronization information contained on additional synchronisation channel 308 of FIG. 7. Downstream clock reference information 322 occupies the majority of the bandwidth, while the upstream transmission of information about the occurrence of respective trigger events 324 and downstream trigger signals 326 occupy smaller portions of the bandwidth. This is only one of the many possible combinations of time domain multiplexing options taught in the present invention, which it will be appreciated is not limited to the illustrated embodiment.

Thus, the method is applicable to the case where combinatorial trigger logic must be applied to a plurality of Trigger Requests. Each attached device therefore has a timeslot available to it in which it can pass a trigger request upstream to a trigger engine. In the case of simple triggers, this upstream trigger request is received by a trigger engine and then a trigger signal is sent in the next downstream trigger timeslot.

The downstream trigger signal may be addressed to specific attached devices or broadcast to all devices.

Furthermore, such a trigger engine may employ combinatorial logic (and possibly also time windowing or other advanced multi-device triggering constraints). Once all required trigger requests have been received and are valid by a trigger engine, a trigger command may be issued in the downstream trigger signal timeslot.

Figure 9:
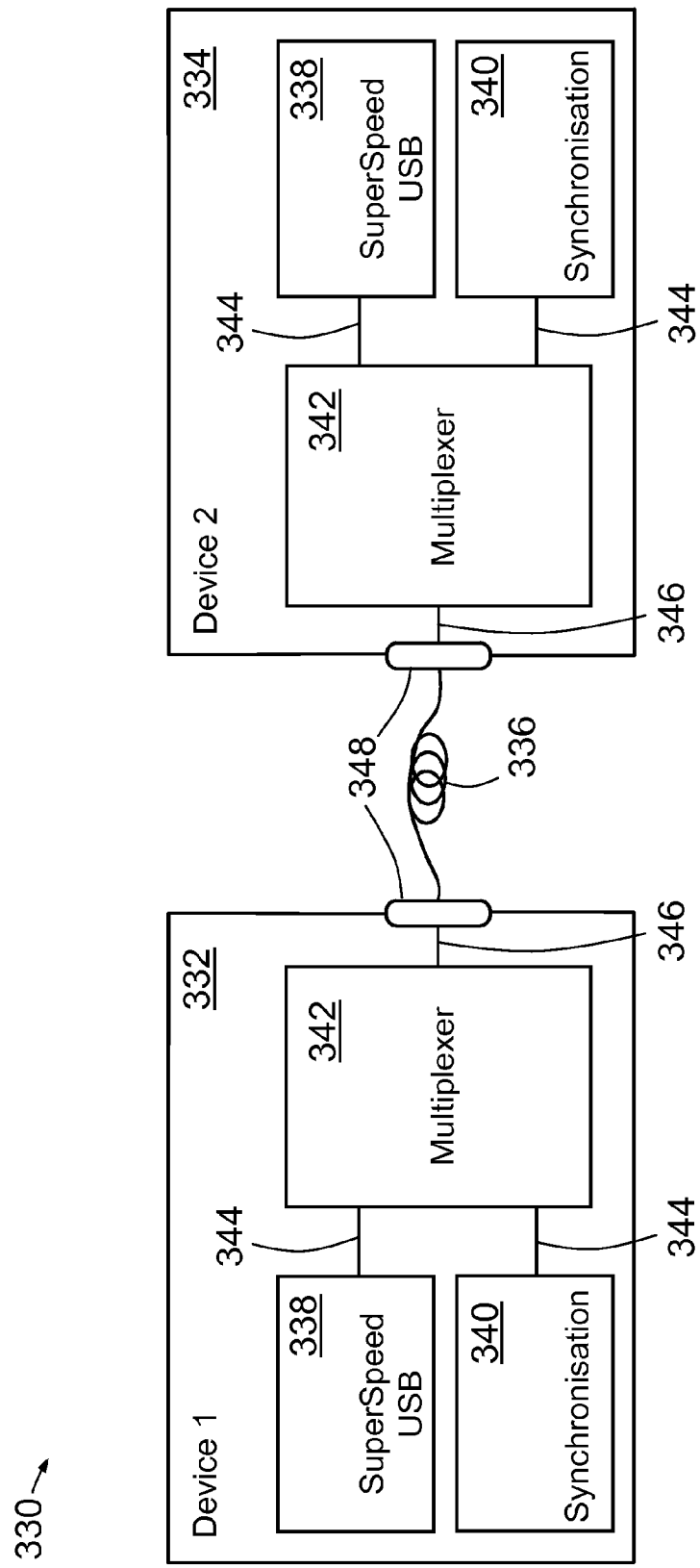
FIG. 9 is a schematic representation of an optical fibre connection between SuperSpeed USB devices according to another embodiment, having the synchronisation channel (such as that of FIG. 8)

FIG. 9 is a schematic representation of a multiplexing arrangement 330 for a SuperSpeed USB device, with a synchronisation channel (which may be of essentially any kind). First SuperSpeed USB device 332 and second SuperSpeed USB device 334 are connected by an optical fibre 336. Typically, one of USB devices 332, 334 will be either a Host Controller or a Hub, while the other USB device 334, 332 will typically be either another Hub or a USB device.

The present embodiment provides a synchronised SuperSpeed USB device operable over relatively large distances from a Host Computer. It is additionally envisaged that such a system can be implemented cost effectively using commonly available optical cabling such as that available for gigabit Ethernet. In this case, a solution using 1310 nm lasers over single mode fibre offers several kilometres range, while moving to the 1550 nm optical band easily extends range to more than 50 km.

Accordingly, in this embodiment optical fibre 336 may be a simple and inexpensive optical fibre, such as based on one of the available Ethernet cable and connector standards such as the Small Form Factor Pluggable (SFP) standards.

Each USB device 332, 334 includes a respective SuperSpeed USB chip 338 which communicates at 5 Gb/s and a respective synchronisation block 340. Synchronisation blocks 340 may be communicating with one another across dedicated signalling lines or it may be designed to communication across the unused non-SuperSpeed USB D+/D− signalling lines. Each USB device 332, 334 includes a respective multiplexer 342 that combines the two signals (i.e. from SuperSpeed USB chip 338 and synchronisation block 340) onto respective optical outputs 346 at respective connectors 348. Multiplexers 342 typically employ wavelength division multiplexing whereby SuperSpeed communication signals can be transmitted at one wavelength and synchronisation signals at another wavelength. Multiplexers 342 of each device 332, 334 is able to demultiplex signals received from the other device 334, 332 by wavelengths into its separate components for subsequent at the receiving device. In this case, signals 344 between respective synchronization blocks 340 and multiplexers 342 are electrical, signals 346 (i.e. between respective multiplexers 342 and connectors 348) and the signal carried over optical fibre 336 are optical.

Figure 10:
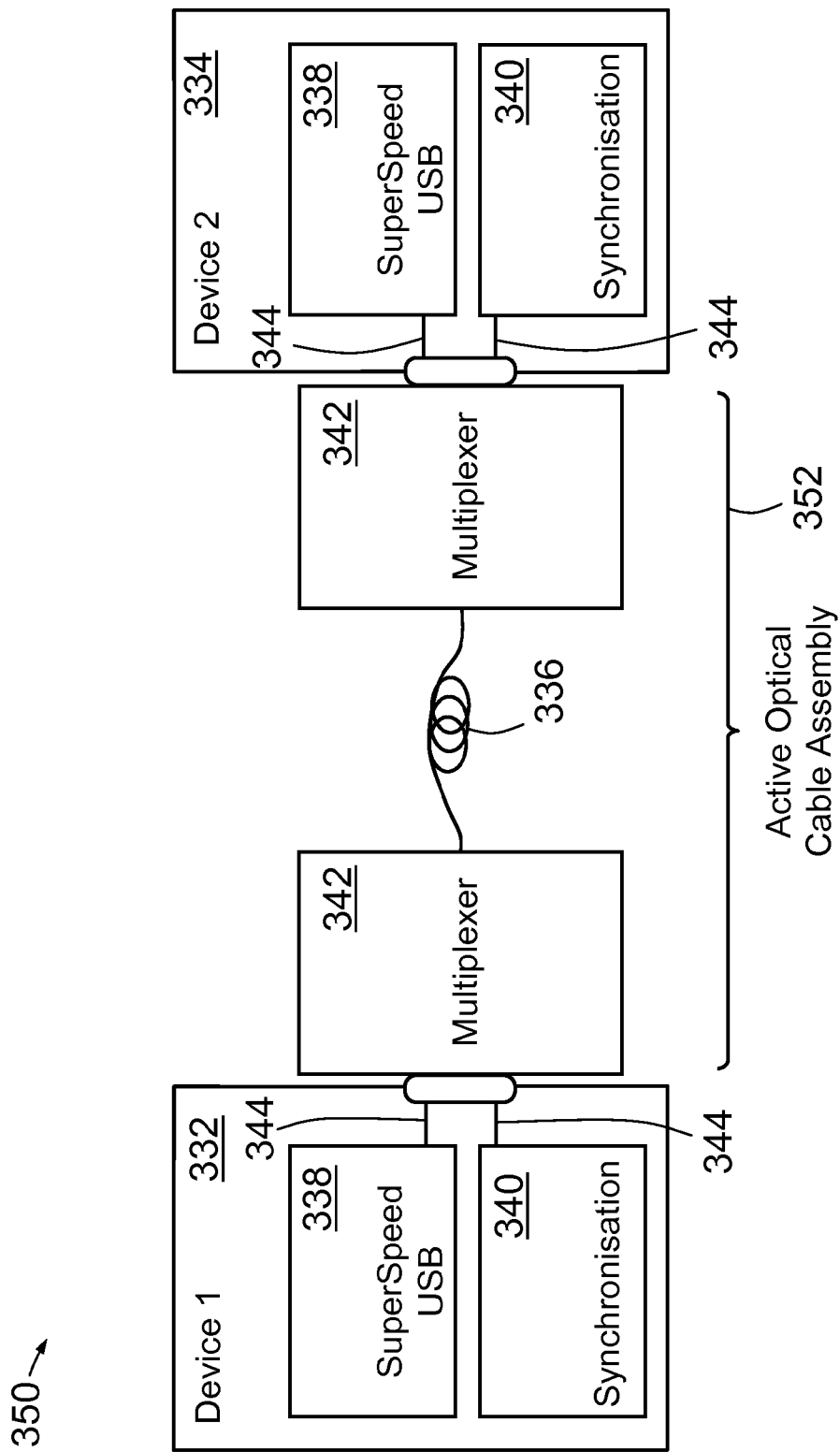
FIG. 10 is a schematic representation of an Active Optical Cable connection between SuperSpeed USB devices according to another embodiment, having the synchronisation channel.

A further variation of this embodiment is shown in FIG. 10, and uses an Active Optical Cable. Thus, FIG. 10 is a schematic representation of a multiplexing arrangement 350 for a SuperSpeed USB device, with a synchronisation channel. In this figure, like reference numerals are used to identify like features when compared with FIG. 9.

In multiplexing arrangement 350, multiplexers 342 form part of an Active Optical Cable assembly 352 that includes multiplexers 342 and optical fibre 336 (connecting multiplexers 342), providing optical transmission between devices 332, 334. All signalling inside USB devices 332, 334 is electrical (as indicated by 344); the connectors 348 are standard SuperSpeed USB connectors containing SuperSpeed connections, power connections and non-SuperSpeed D+/D− connections, which are all also electrical. Non-SuperSpeed synchronisation channels as taught in this invention therefore utilise active optical cabling including a wavelength division multiplexing architecture for extending the device distribution distance while maintaining high signal integrity.

Modifications within the scope of the invention may be readily effected by those skilled in the art. It is to be understood, therefore, that this invention is not limited to the particular embodiments described by way of example hereinabove and that combinations of the various embodiments described herein are readily apparent to those skilled in the art.

In the preceding description of the invention and in the claims that follow, except where the context requires otherwise owing to express language or necessary implication, the expression "Host Controller" embraces all forms of USB Host Controller, including standard USB Host controllers, USB-on-the-go Host Controllers and wireless USB Host Controllers.

In the preceding description of the invention and in the claims that follow, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to background art is not intended to imply that such background art forms or formed a part of the common general knowledge in any country.

The invention claimed is:

1. A method of providing a synchronisation channel to a SuperSpeed USB device, comprising:
    establishing a SuperSpeed communication channel connection to said SuperSpeed USB device with a USB cable that has USB 2.0 D+ and D− data signalling lines disabled or disconnected at an upstream connection point;
    multiplexing synchronization information onto said D+/D− data signalling lines at the upstream connection point; and
    demultiplexing the synchronization information from said D+/D− signalling lines at a downstream connection point of the cable;
    whereby said synchronisation channel is maintained across the D+/D− data signalling lines.

2. A method as claimed in claim 1, wherein said synchronization information comprises a plurality of signals from the group consisting of:
    a clocking signal,
    an absolute time reference,
    a trigger signal; and
    clock phase information.

3. A method as claimed in claim 1, comprising transmitting said synchronization information in a time-domain multiplexed manner, whereby components of said synchronization information occupy respective timeslots within a total communication bandwidth of said synchronisation channel.

4. A method as claimed in claim 3, wherein said transmitting of said synchronization information in said time-domain multiplexed manner includes at least one timeslot for downstream transmission of clock reference information, at least one timeslot for each attached device to provide upstream transmission of trigger information to a trigger engine, and at least one timeslot for downstream transmission of trigger information to attached devices.

5. A method as claimed in claim 1, wherein said synchronization information is either in the form of differential signalling across the D+/D− data signalling lines or in the form of single-ended signalling on the D+ and D− data signalling lines.

6. A method as claimed in claim 1, further comprising:
repeating the steps of the method for a plurality of SuperSpeed USB devices, each of said SuperSpeed USB devices being connected by a respective USB link with USB 2.0 D+ and D− data signalling lines that are disabled or disconnected at an upstream connection point, wherein the synchronization information enables synchronous operation of the USB devices.

7. A method as claimed in claim 6, further comprising:
transmitting an absolute time reference signal in (i.e. as a component of) the synchronization information to the USB devices;
decoding the absolute time reference signal at each of the USB devices and latching the absolute time reference signal into respective absolute time registers at the USB devices; and
clocking the absolute time registers by said syntonised local clocks;
whereby the absolute time registers contain the same notion of real time, enable synchronous execution of trigger commands and synchronously control the operation of each of the USB devices.

8. A method as claimed in claim 7, wherein said absolute time reference comprises a coordinated universal time or global positioning satellite system with a one-second boundary indication.

9. A method as claimed in claim 1, wherein said synchronization information is distributed across both the USB D+ and USB D− data signalling lines.

10. A USB device, comprising:
first circuitry adapted to perform at least one SuperSpeed USB device function;
second circuitry adapted to perform at least one non-SuperSpeed USB device function;
a local clock;
synchroniser circuitry; and
multiplexing circuitry for placing the second circuitry and upstream non-SuperSpeed USB D+/D− data signalling lines of the USB device in data communication, and operable to selectively connect and disconnect the synchroniser circuitry and the non-SuperSpeed USB D+/D− data signalling lines;
wherein the USB device is enabled as a synchronised USB device when the synchroniser circuitry and the non-SuperSpeed USB D+/D− data signalling lines are connected by the multiplexing circuitry so that the local clock can be synchronised to information contained in the signals carried by the non-SuperSpeed USB D+/D− data signalling lines.

11. A device as claimed in claim 10, wherein said multiplexing circuitry is operable to connect and disconnect said second circuitry and said non-SuperSpeed USB D+/D− signalling lines.

12. A device as claimed in claim 10, further comprising:
a timer;
a third circuitry adapted to decode data communications received and transmitted on said upstream port;
a fourth circuitry adapted to start, stop and reset said timer;
a fifth circuitry adapted to report said timer value to an attached USB Host Controller;
wherein said timer is adapted to measure a latency time in said USB device between receiving a first specific signal and responding by transmitting a second specific signal.

13. An apparatus for synchronising a plurality of attached SuperSpeed USB devices, the apparatus comprising:
circuitry adapted to perform a SuperSpeed USB Hub function, said circuitry providing an upstream port and a plurality of downstream ports;
circuitry adapted to perform a non-SuperSpeed USB Hub function said circuitry providing an upstream port and a plurality of downstream ports;
synchroniser circuitry comprising a local clock, and adapted to generate synchronization information, said synchronization information comprising clock signals, a notion of time and trigger signals;
circuitry adapted to observe both said SuperSpeed and non-SuperSpeed upstream ports and to lock said local clock to a data structure contained on said upstream port;
a respective multiplexer for each downstream port of said USB Hub function circuitry, said plurality of multiplexers adapted to multiplex either signals from said non-SuperSpeed USB Hub function or from said synchroniser onto said each of said plurality of downstream ports of said apparatus; and
controller circuitry adapted to control the state of said plurality of multiplexers;
wherein said controller circuitry is adapted to control said plurality of multiplexers to connect either said non-SuperSpeed Hub function downstream ports or said synchroniser output to said respective downstream ports of said apparatus.

14. An apparatus as claimed in claim 13, wherein said controller circuitry comprises a USB device attached to one of said downstream ports of said circuitry adapted to perform said SuperSpeed USB Hub function.

* * * * *